United States Patent [19]
Ogata et al.

[11] Patent Number: 5,758,124
[45] Date of Patent: May 26, 1998

[54] COMPUTER EMULATOR

[75] Inventors: Hideaki Ogata; Akihito Tanimoto; Yasushi Nakaoka; Masanori Kojima; Yutaka Akahori, all of Nagano-Ken, Japan

[73] Assignee: Seiko Epson Corporation, Tokyo, Japan

[21] Appl. No.: 559,223

[22] Filed: Nov. 17, 1995

[30] Foreign Application Priority Data

Nov. 18, 1994 [JP] Japan .................................. 6-309813

[51] Int. Cl.⁶ .................................................. G06F 9/455
[52] U.S. Cl. .................... 395/500; 395/527; 395/421.03;
364/DIG. 1; 364/232.3; 364/DIG. 2; 364/927.81;
364/955.5
[58] Field of Search ............................ 395/500, 375,
395/750, 800, 416, 527, 421.03; 364/200 MS File,
900 MS File, 927.81

[56] References Cited

U.S. PATENT DOCUMENTS 5,062,042  10/1991  Binkley et al. .................... 364/200
5,481,684  1/1996   Richter et al. .................... 395/375
5,497,494  3/1996   Combs et al.1 .................... 395/750
5,504,922  4/1996   Seki et al. ........................ 395/800
5,548,763  8/1996   Combs et al. ..................... 395/750
5,551,043  8/1996   Crump et al. ..................... 395/750
5,577,220  11/1996  Combs et al. ..................... 395/416

FOREIGN PATENT DOCUMENTS 546406  2/1993  Japan .

*Primary Examiner*—Jacques H. Louis-Jacques
*Assistant Examiner*—Russell W. Frejd
*Attorney, Agent, or Firm*—Loeb & Loeb LLP

[57] ABSTRACT

What is disclosed is an emulator that emulates on an execution machine the operation of a target machine. The emulator emulates routines that are called via a jump table such as the BIOS. Control is transferred to an emulation module not by directly trapping the procedure to call the BIOS but by placing a privileged instruction (a halt instruction, for example) in the area called and by causing a trap through the execution of the privileged instruction. An identifier is placed after the halt instruction and a needed BIOS emulation module is called by a dispatcher using this identifier. Therefore, normal operation can be obtained even if there is a resident program which rewrites the jump table.

2 Claims, 18 Drawing Sheets

COMPUTER EMULATOR

BACKGROUND

1. Field of the Invention

The present invention pertains to an emulator, and more particularly, to an emulator for executing on an executing machine, said executing machine being computer equipped at minimum with an operation part, memory and input/output unit, and programs designed for a target machine, said target machine being computer equipped with an architecture different from the architecture of said executing machine.

2. Description of the Prior Art

A conventional virtual computer emulator of this type which makes application programs developed for a target machine executable on an executing machine by individually emulating OS function calls, BIOS function calls, I/O instructions and interrupt tables of the target machine has been known as disclosed in Japan Laid-Open Patent H5-46406.

In such an emulator, when an instruction that should be emulated is executed or when an address or I/O that should be emulated is accessed, this instruction, address or I/O is stored. Analysis is then performed as to what processes are to be executed, and a substitute routine prepared in advance is executed using functions of a specific central processing unit (hereinafter 'CPU') so that the same result is obtained on the executing machine.

In recent years, a specific operating system is often used in a particular machine. In this case, a BIOS (Basic Input/Output System) or BDOS (Basic Disk Operating System) is normally used. Of these, the BIOS is a part of the machine, similar to hardware, that runs processes linked to specific hardware. The BIOS makes possible specific input/output processing without concern for differences in hardware when using an application program running on the operating system. For example, where a character is input from the console, a certain program has the system return from a subroutine an input character as a return value if a specific BIOS address is called and there is a character input, despite any differences in actual hardware. The routines pertaining to the hardware include those for the keyboard, CRT, serial communications ports, floppy disk drive, hard disk drive, calendar clock, timer, etc., and the various BIOS routines dealing with these are generally provided in ROM.

These BIOS routines can be called directly by the application program, but it is also common for them to be called via a device driver. This situation is shown in FIG. 19. These BIOS routines for various hardware functions are called via software interrupts or directly by reference to a jump table. Therefore, where a BIOS function of the target machine is to be emulated, this jump table is rewritten, or the software interrupt itself is stored as a privileged instruction, and the BIOS function is substituted by an equivalent routine in the executing machine. Furthermore, if there is an equivalent routine in the BIOS of the executing machine, it may be used as a substitute just as it is.

However, where a group of routines such as those in the BIOS are stored during the calling process and substituted, the software that normally operates in the target machine may not normally operate in the executing machine that performs emulation. For example, some resident programs extend some of the operating system functions by rewriting the BIOS jump table. If the emulator stores the call process itself, these programs can no longer be called, and therefore normal operation is no longer possible.

In addition, application programs that directly call the BIOS by referring to the BIOS jump table or by using a BIOS entry point known in advance cannot be dealt with simply by storing software interrupts. This problem is not limited to the BIOS, but also exists for routines called via the jump table or routines called directly using the previously-known entry point.

The emulator of the present invention solves these problems. Its object is to emulate in a separate executing machine a group of routines that can be called via a jump table in the target machine, for which the construction described below is employed.

SUMMARY

An object of a preferred embodiment of the present invention is an emulator that operates on an execution computer to execute programs designed to operate on a target computer.

Another object of a preferred embodiment of the present invention is an emulator that emulates a group of routines in a target computer that can be called via a jump table.

Briefly, the emulator of a preferred embodiment executes on an executing machine, said executing machine being computer equipped at minimum with an operation part, memory and input/output unit, and programs designed for a target machine, said target machine being computer equipped with an architecture different from the architecture of the executing machine. The emulator comprises function modules that allow the executing machine to execute processes equivalent to processes that can be called via a jump table in the target machine, and transfer controller that, when one of the processes in the target machine is called via said jump table, transfers the process to a corresponding one of said function modules in the executing machine prior to the actual onset of processing.

Furthermore, the transfer controller transfers said process to a corresponding one of said function modules in said executing machine prior to the actual onset of processing when one of said processes in said target machine is called via an address prescribed in advance. In connection with a group of routines, such as those in a BIOS, for example, the emulator of a preferred embodiment transfers control to a group of function modules in an executing machine that perform equivalent routines before the actual onset of processing but after the routines are called. Therefore, control is not transferred to the substitute routines before the original routines are called. Thus, the emulation that is performed even includes the onset of routines that would have started after the detection of these routines.

Furthermore, the transfer controller may include a detector for detecting the execution of a privileged instruction placed in the address through which one of said routines was called, and transfer control to a corresponding one of said function modules according to said detection of a privileged instruction. Therefore it can accurately and easily detect the calling of this routine. The privileged instruction may be an instruction to suspend the processing unit. Normally, since an instruction to suspend the processing unit has a shorter execution cycle than that for other instructions, it can be efficiently transferred to the control under emulation.

The transfer controller may include a privileged instruction allocator that allocates the privileged instruction to a prescribed memory area prior to the onset of emulation, a jump table converter that converts the contents of the jump table to the address to which said privileged instruction was allocated prior to the onset of emulation, a detector that detects the execution of the privileged instruction placed in the address through which one of the processes was called, and a transfer controller for transferring a corresponding one of said group of function modules according to the detection of the privileged instruction. Therefore, the operation of various elements may be performed automatically after this processing.

The privileged instruction allocator may also search for an area in a prescribed memory region to which the privileged instruction may be allocated, and may allocate an identifier that indicates the corresponding one of the routines in the searched and found area together with the privileged instruction. Therefore, this emulator is capable of allocating a privileged instruction to an area which it searches for and finds. In cases where there is more than one privileged instruction, it can allocate identifiers. As a result, when a privileged instruction is executed, it is easy to specify the cause of the privileged instruction, thereby making the startup of necessary emulation easy.

DETAILED DESCRIPTION

Figure 1:
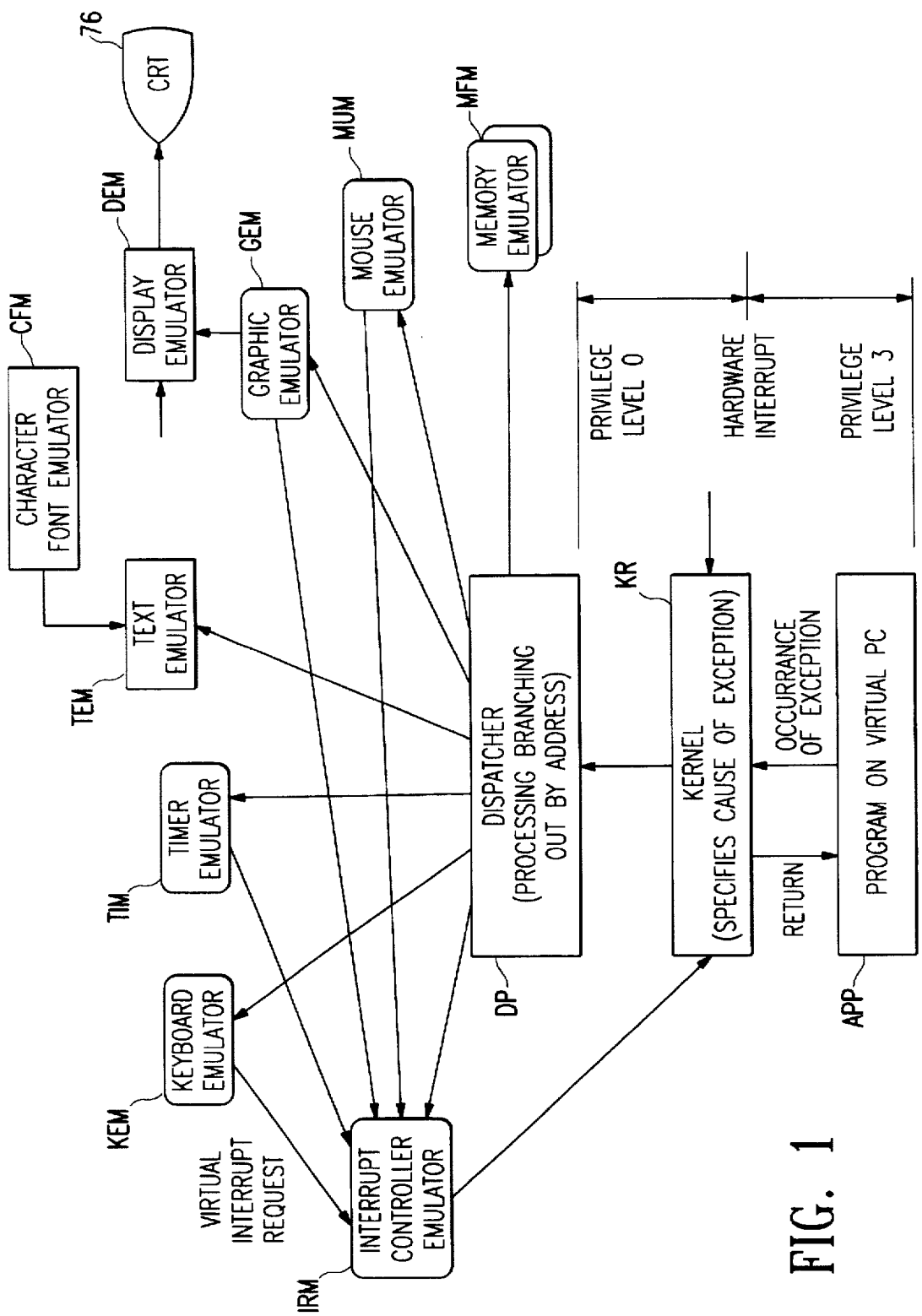
FIG. 1 is a block diagram that shows the approximate construction of the emulator of one embodiment of the present invention.
Figure 2:
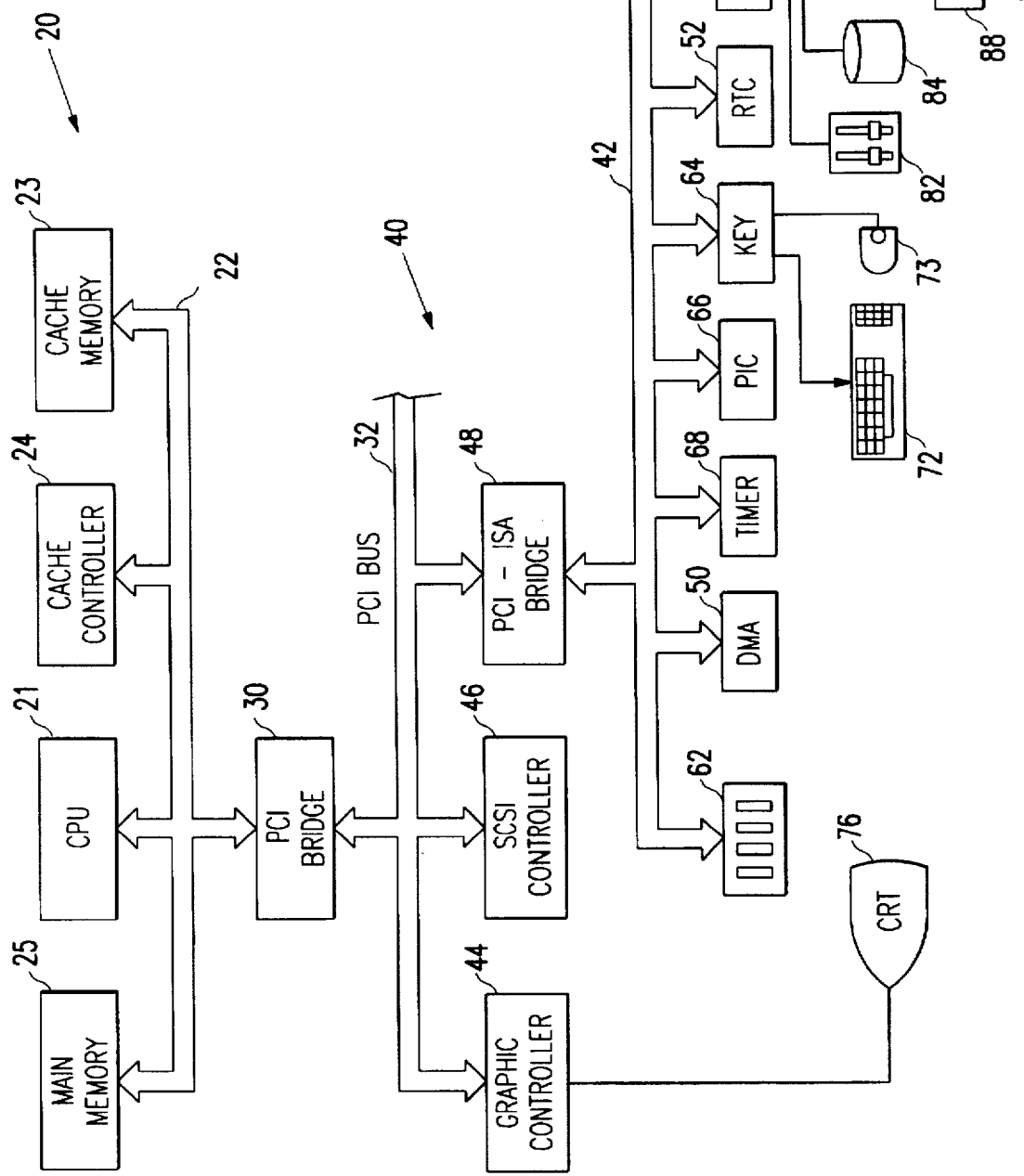
FIG. 2 shows the construction of a DOS/V unit to be used as an executing machine.
Figure 3:
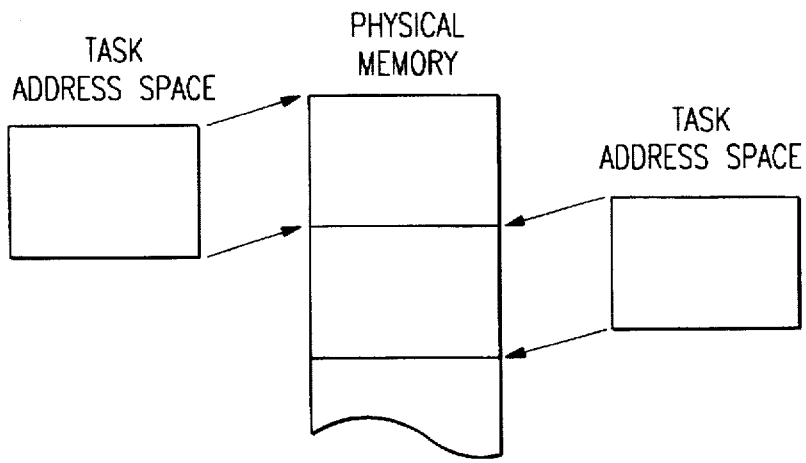
FIG. 3 is an illustration showing the relationship between the task address and physical memory.

Preferred embodiments of the present invention are explained below in order to further clarify the construction and operation of the present invention described above. FIG. 1 shows a block diagram of the construction of the emulator of a preferred embodiment. This emulator may use a PC-AT compatible DOS/V machine (PC-AT and DOS/V are IBM trademarks) as the executing machine and thereby obtain the architecture of the PC-9800 series (PC-9800 is NEC's trademark), which is the target machine, in said executing machine. FIG. 2 shows a block diagram of the conceptual construction of a DOS/V machine, while FIG. 3 is an illustration to explain its memory and I/O map.

For the convenience of explanation, the construction of the DOS/V unit, which is the executing machine, will be explained first with reference to FIG. 2. As shown in the drawing, this DOS/V unit comprises an operation part 20 connected to local bus 22, PCI bridge 30 which connects local bus 22 to PCI bus 32, which is one of the external buses, controller 40 which is accessed by CPU 21, etc. of operation part 20 via PCI bus 32, and I/O part 60 in which equipment that controls various I/O units is connected to ISA bus 42, which is a low-speed external bus, as well as keyboard 72, speaker 74, CRT 76, etc., which are peripheral equipment.

Operation part 20 comprises CPU 21 which works as the central processing unit (Intel's Pentium chip may be used in this embodiment), cache memory 23, its cache controller 24 and main memory 25. PCI bridge 30 is a controller having a function to control high-speed PCI bus 32. The memory area handled by CPU 21 is extended by various registers inside CPU 21 to virtual addresses exceeding the physical addresses.

Controller 40 comprises graphic controller 44 which controls the display on the screen of monitor CRT 76 (hereinafter 'VGA'), SCSI controller 46 which controls data transfer to connected SCSI equipment and PCI-ISA bridge 48 which controls the interface between PCI bus 32 and a subordinate ISA bus. VGA 44 is capable of displaying on CRT 76 with a 640×480 resolution and 16 colors. This VGA 44 is mounted with a character generator which saves display fonts in memory, a graphic controller which draws prescribed figures upon receiving prescribed commands, a video memory which saves drawn screens, etc. Since the constructions of these are well known to those of ordinary skill in the art, they will only be described below when necessity arises and are omitted in FIG. 2.

ISA bus connected through PCI-ISA bridge 48 is a bus for input/output control to which various I/O devices are connected, and comprises DMA controller (hereinafter 'DMA') 50, real time clock (RTC) 52, compound I/O ports 54, sound I/O 56, keyboard interface (hereinafter 'KEY') 64 which controls the interface between keyboard 72 and mouse 73, interrupt controller (hereinafter 'PIC') 66 which performs prioritized interrupts, and timer 68 which performs various types of time counting and generates a beep sound. ISA slot 62 to which an expansion board may be mounted is connected to ISA bus 42.

Compound I/O ports 54 includes ports for the input/output of signals to control floppy disk device 82 and hard disk 84 in addition to ports for parallel output and serial output. Printer 88 is connected to the parallel I/O via parallel port 86 while modem 92 is connected to serial I/O via serial port 90. Microphone 96, as well as speaker 74 above, may be connected to sound I/O 56. Other than these, standardized I/O channels are often used in the DOS/V machine, but explanation thereof is omitted in this embodiment and they are also omitted in the drawings.

Figure 4:
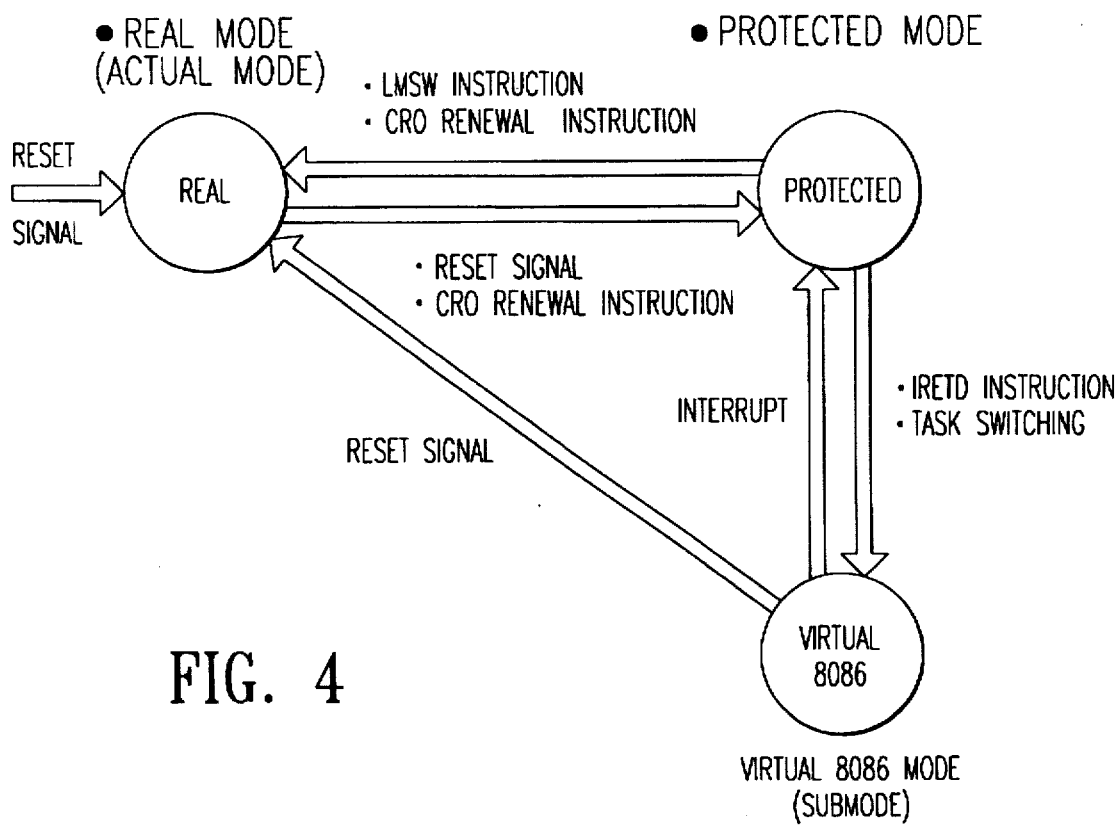
FIG. 4 is an illustration showing execution modes and the method by which switching among them occurs.

The emulation of the architecture of a PC-9800 on a DOS/V unit having the construction described above is explained below. The memory management function and execution modes of CPU 21 of the DOS/V unit, the executing machine of this embodiment, will be explained first. FIG. 3 shows the relationship between the address area managed by a task and physical addresses. FIG. 4 illustrates the relationships among the real mode, protected mode and virtual 8086 mode. CPUs higher than an i80386 (by Intel), for example, have a function to allocate an address managed by a task to a prescribed physical address so that processing is performed in the task using a prescribed theoretical address. Therefore, where control has been transferred to respective tasks the same address for other tasks is not affected whatsoever, even if a prescribed address is accessed in a task.

This CPU 21 has three operation modes: real mode, protected mode and virtual 86 mode. Real mode is a mode in which this CPU 21 operates as a high-speed 8086. When MS-DOS (trademark of Microsoft), etc. is booted, processing is usually begun in this real mode. Protected mode is an operation mode in which a ring protection function with set privilege levels is used. Protection from direct access by a specific routine is obtained by setting privilege levels on a segment-by-segment basis. For example, by setting the privilege level of an application program at the lowest level, direct access to an address range and I/Os prescribed as a system may be easily denied. In a case where direct access occurs, exception handling is initiated and a so-called trap occurs so that control is transferred to a designated address. Further, in virtual 8086 mode, 8086 codes may be directly executed while protected mode is still present. CPU 21 operates in the same manner as when it is in protected mode, but it interprets the logical addresses designated by the application program in the same manner as an 8086 in execution.

Figure 5:
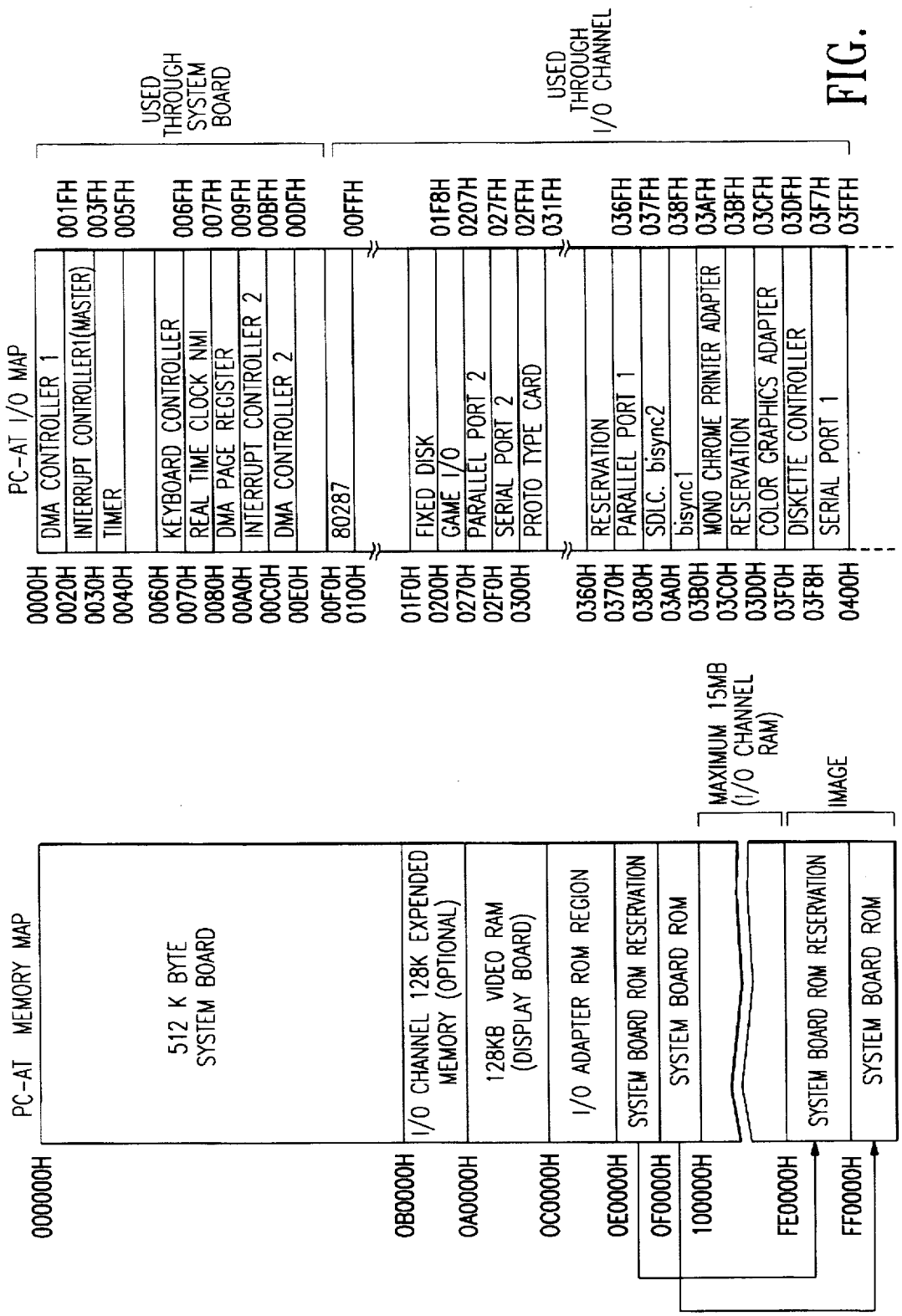
FIG. 5 is an illustration showing the memory map and I/O map immediately after the startup of a DOS/V unit.
Figure 6:
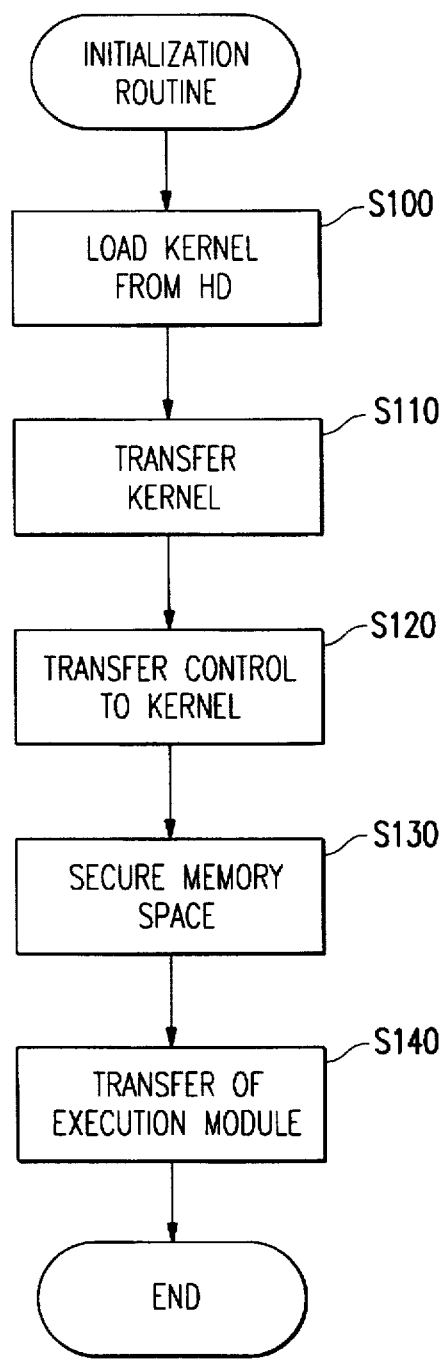
FIG. 6 is a flow chart showing the initialization routine of the emulator.
Figure 7:
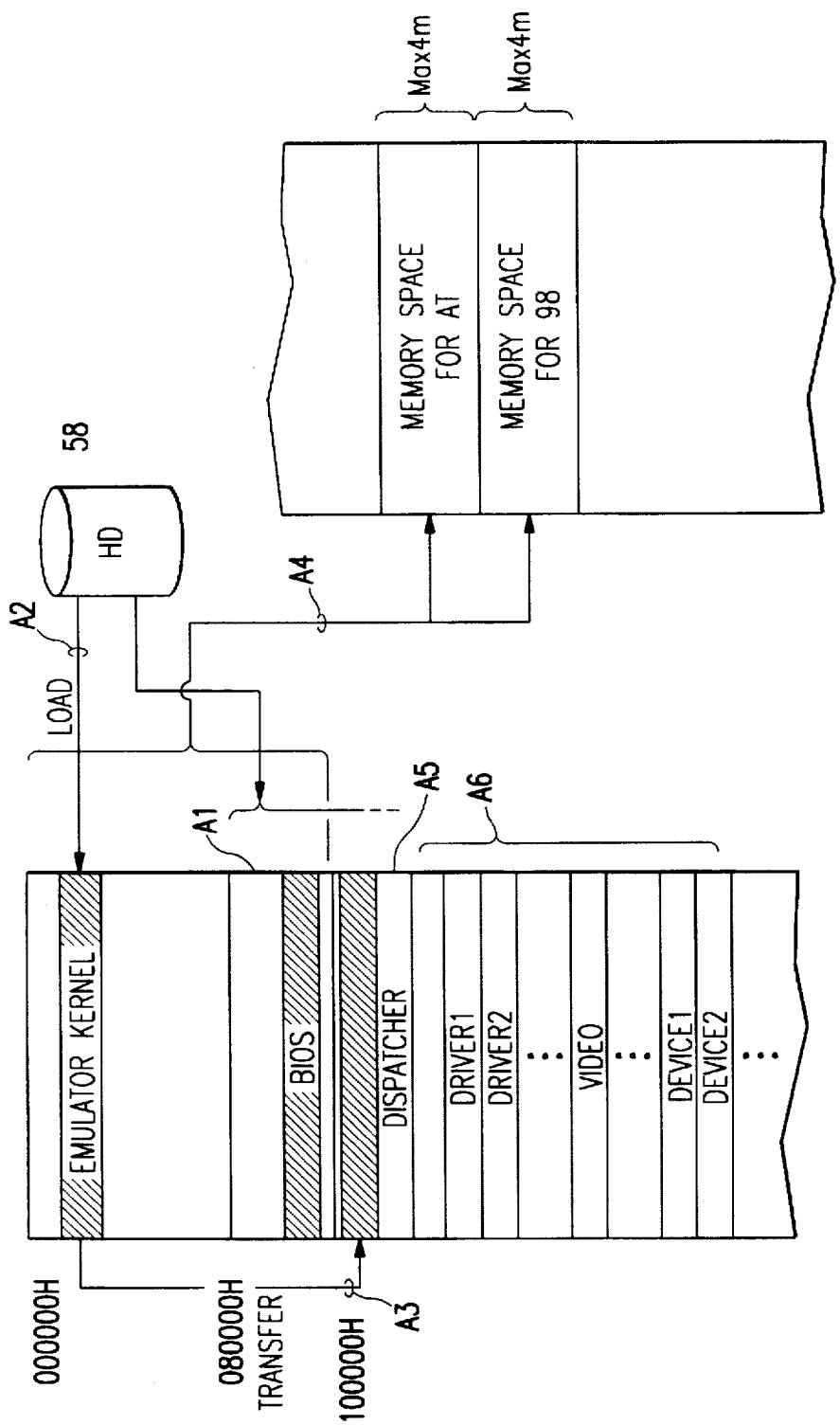
FIG. 7 is an illustration showing the manner in which initialization takes place.

When the DOS/V unit of the present invention is turned ON, it reads the boot block of the hard disk so that the operating system, etc. on the hard disk may be read. Its BIOS provided in the form of ROM is also made accessible in the main memory (A1 in FIG. 7, to be explained below). The memory map and I/O map of the DOS/V unit are shown in FIG. 5. The initialization routine is then executed. This routine is shown in FIG. 6. The manner of execution of the initialization routine shown in FIG. 6 is also shown in FIG. 7. The initialization of the emulator is explained below with reference to the flow chart of FIG. 6 and the illustration of FIG. 7.

When the initialization routine shown in FIG. 6 is initiated, the kernel of the emulation program is first loaded from hard disk 58 (step S100, A2 in FIG. 7). The term 'kernel' refers to a series of procedures within the emulation processes that, when an exception handling is initiated, performs analysis to determine why the exception routine was initiated and calls execution modules which actually perform emulation via a process called a dispatcher. The term 'dispatcher' refers to a series of procedures within the emulation processes that call the execution modules which actually perform emulation based on the analysis by the kernel. Subsequent to this loading of the kernel, the kernel is transferred to its execution position (step S110, A3 in FIG. 7) and control is transferred to the kernel (step S120). Therefore, although the routine is shown in FIG. 6 as a continuous process, the processes including and subsequent to step S130 are done by the kernel itself.

The kernel transfers some of the programs for the protected mode. It then switches the operation mode of CPU 21 to the protected mode and performs processing to preserve the memory areas for the DOS/V unit and the PC-9800, respectively, in upper addresses (step S130, A4 in FIG. 7). These memory areas correspond to virtual DOS/V tasks and PC-9800 tasks and are logically allocated as 1M main memories starting from 000000H. Subsequently, the dispatcher that operates together with the kernel (A5 in FIG. 7) and various execution modules which perform the emulation are sequentially transferred (step S140, A6 in FIG. 7). A part of the kernel functions and virtual DOS/V's BIOS routines are then allocated in the space from 000000H through 100000H on the physical memory, and the execution modules for the emulation are allocated above.

The execution modules that are sequentially loaded into the memory in step S140 are read from hard disk 84 according to a list written in the form of text data in a file having a prescribed name. The process of initialization following the allocation of the execution modules is explained below. Prior to this, however, the entire construction after all the execution modules are loaded will first be explained with reference to FIG. 1. When kernel KR, dispatcher DP and various execution modules are loaded and initialization takes place, as shown in FIG. 1, the emulator of this embodiment will be realized in the DOS/V unit. In other words, this emulator comprises kernel KR which is called when an exception is deemed to have occurred. Program APP is executed in the environment which is virtually prepared on the DOS/V and is identical to that of the PC-9800 (hereinafter referred to as 'the virtual PC') has executed a privileged instruction, etc. Dispatcher DP is called based on the cause of the exception designated by kernel KR and which calls various execution modules having different functions, and various execution modules which perform emulation of various different functions when called by dispatcher DP based on this cause of the exception.

The execution modules that actually perform emulation are prepared for various functions by roughly dividing the hardware of the PC-9800 based on function. FIG. 1 shows the main modules only. Memory emulator MEM is a module that emulates the state of the main memory and EMS. Mouse emulator MUM is a module that emulates PC-9800's mouse using the movement of mouse 73 of the DOS/V unit. Graphic emulator GEM is a module that emulates the graphics screen of the PC-9800. On the other hand, text emulator TEM is a module that operates together with character font emulator CFM that emulates the acquisition of the image of characters designated by character codes. It emulates the text screen of the PC-9800. After a virtual PC-9800 image is created via the emulation by text emulator TEM and graphic emulator GEM, the display of the image to actual CRT 76 is emulated by display emulator DEM.

Timer emulator TIM is a module that emulates the processing related to the timer of a PC-9800 using timer 68 built into the DOS/V unit. Keyboard emulator KEM is a module that emulates the key input from the keyboard of a PC-9800 via the keyboard of the DOS/V unit and KEY 64.

Figure 8:
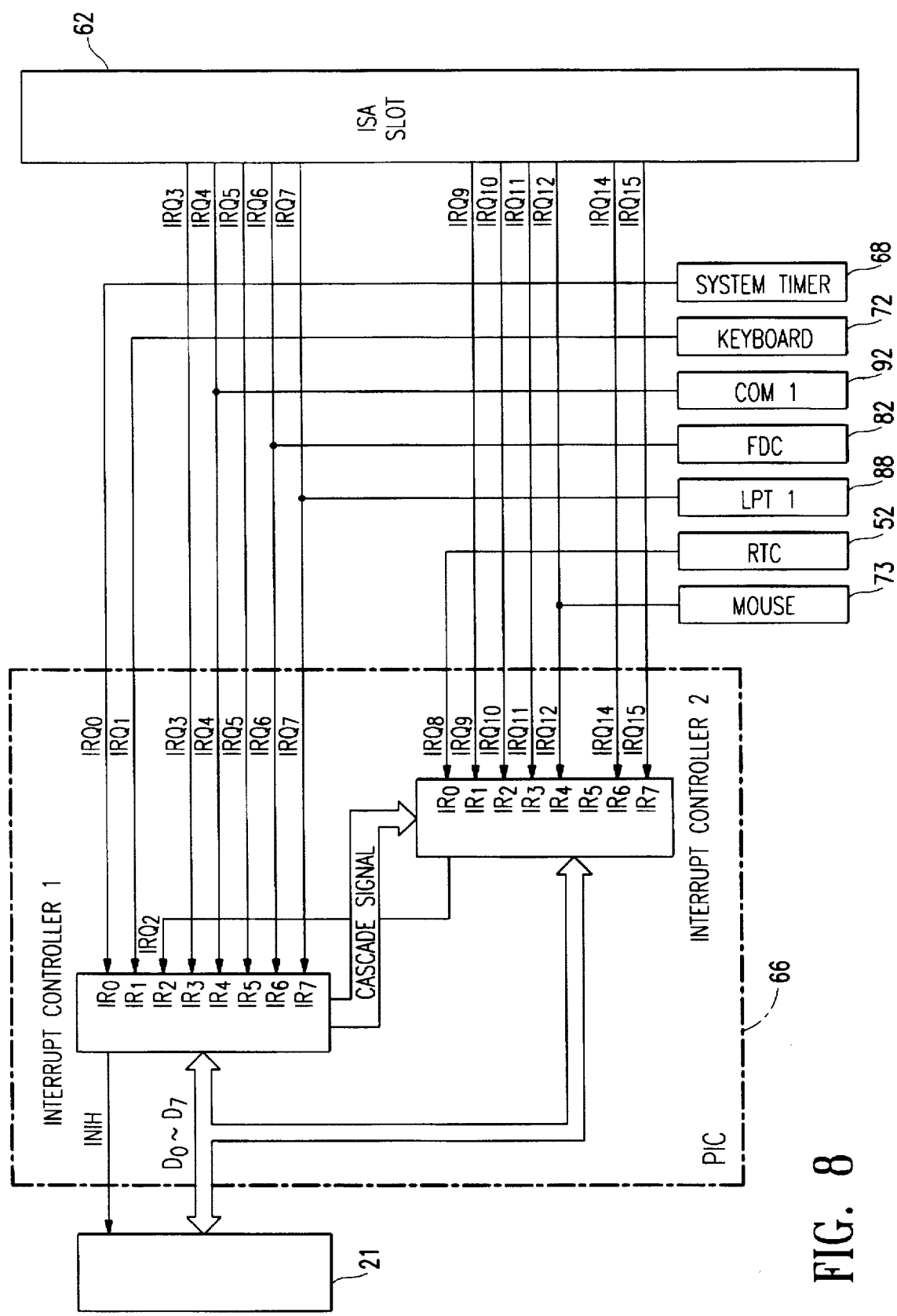
FIG. 8 is a block diagram showing circuits related to interrupts in a DOS/V unit.

Furthermore, interrupt controller emulator IRM is a module that emulates interrupts of a PC-9800 using the interrupt function of the DOS/V unit. This interrupt controller emulator IRM is called by many modules via interrupts. The circuits for interrupt routines in the DOS/V unit are shown in FIG. 8. Since interrupt requests are issued by many devices to PIC 66, as in the PC-9800, some interaction is necessary among modules that emulate this as well. Some of the interface circuits are omitted in FIG. 8 for the sake of convenience in drawing, but an interrupt request is naturally issued via a dedicated interface circuit. For example, an interrupt request from mouse 73 is not directly issued but is issued via KEY 64 which is an interface circuit.

Actual hardware interrupts in the DOS/V unit are handled as exceptions for which control is transferred to kernel KR, in addition to the execution of a privileged instruction and the writing to a range for which write protection is designated. In addition, an interrupt that is initiated by interrupt controller emulator IRM due to a hardware interrupt or by a routine inside the modules in order to emulate the operation of a PC-9800 is a factor in the calling of kernel KR (generation of a virtual interrupt).

Figure 9:
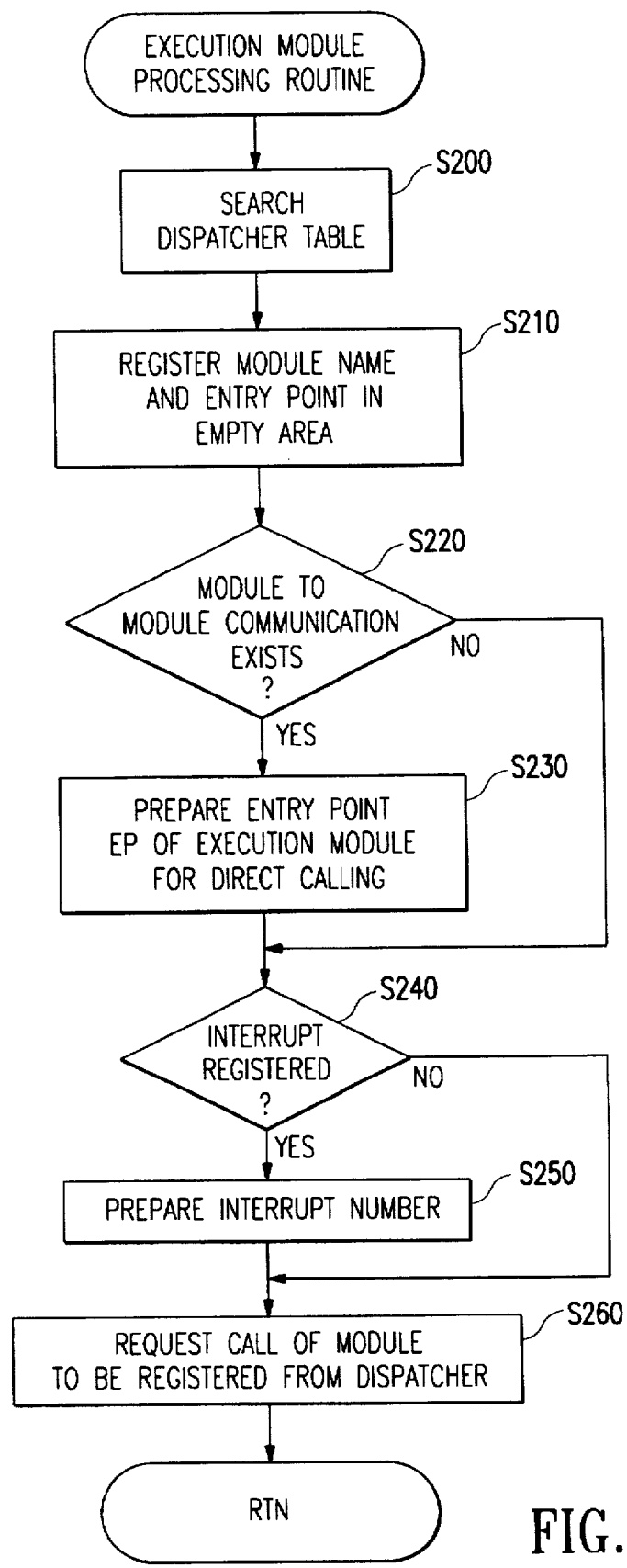
FIG. 9 is a flow chart showing the routine to incorporate an execution module.

These various execution modules are read from hard disk 84 by kernel KR during initialization and are allocated to the memory. Each time memory is allocated to an execution module during initialization, the incorporating routine already resident in the execution module is executed once. One example of a routine performed by an execution module at this time is shown in the flow charts of FIGS. 9 through 11. The manner of performance of the routine shown in FIG. 9 is shown in the illustration of FIG. 12. The routine for incorporating an execution module will now be explained with reference to these drawings.

In the incorporating routine for an execution module (execution module DM1 in FIG. 12, for example), dispatcher DP first searches dispatcher table DT resident in a prescribed memory area (step S200) and registers the module name (eight letters and/or numerals) TM1 and its call address A1 (step S210). In actuality, these search and registration processes take place using the functions of kernel KR and dispatcher DP as shown in FIG. 12. In other words, address AA through which kernel KR is serviced from execution module DM is prepared as a fixed address. Execution module DM calls this address AA and requests registration of module name (characters) TM and its call address A (B1 in FIG. 12). Kernel KR then obtains the call address of dispatcher DP with reference to the table registered in advance by dispatcher DP itself and requests the service of registration from dispatcher DP using this address AD. Upon receiving this request, dispatcher DP registers the module's name (characters) TM and calls address A in dispatcher table DT (B2 in FIG. 12).

The above method in which various services are requested from dispatcher DP via fixed address AA of kernel KR is also used when one execution module calls another module and when modules that are to communicate with each other mutually register the other's entry point EP for direct calling. For example, when one execution module calls another execution module, the service to call the execution module is requested from dispatcher DP via fixed address AA of kernel KR. Dispatcher DP can easily obtain the call address of the module to be called by referring to dispatcher table DT and thereafter call that module (B3 in FIG. 12). Therefore, among kernel KR, dispatcher table DT and the various execution modules, it is only fixed address AA of kernel KR that must be managed in a fixed fashion in advance, which provides the advantage that management is quite easy.

It is then determined whether or not there is a registration that module-to-module communication will take place in execution module DM1 (step S220). Execution modules are sequentially registered according to the contents of a registration file. For example, if an nth execution module DMn is activated in the above manner and it is determined that module-to-module communication will take place (step S220) after the registration of module name TMn and call address An (B2 in FIG. 12), entry point EP for direct calling which exists inside execution module DMn is prepared as a parameter (step S230). This entry point EP is an address for direct calling which is given to another execution module that the execution module will be communicating with. If there is no such entry point, no entry points will be prepared, and if there is more than one, that number of entry points EP will be prepared. Between closely related modules, there are times when, in order to preserve high-speed emulation, it is desired to directly call a routine that is a part of the functions of a module instead of calling the entire module using call address An. In such a case, it is necessary for the execution module to give its entry point EP to the other execution modules with which it will be communicating.

Figure 13:
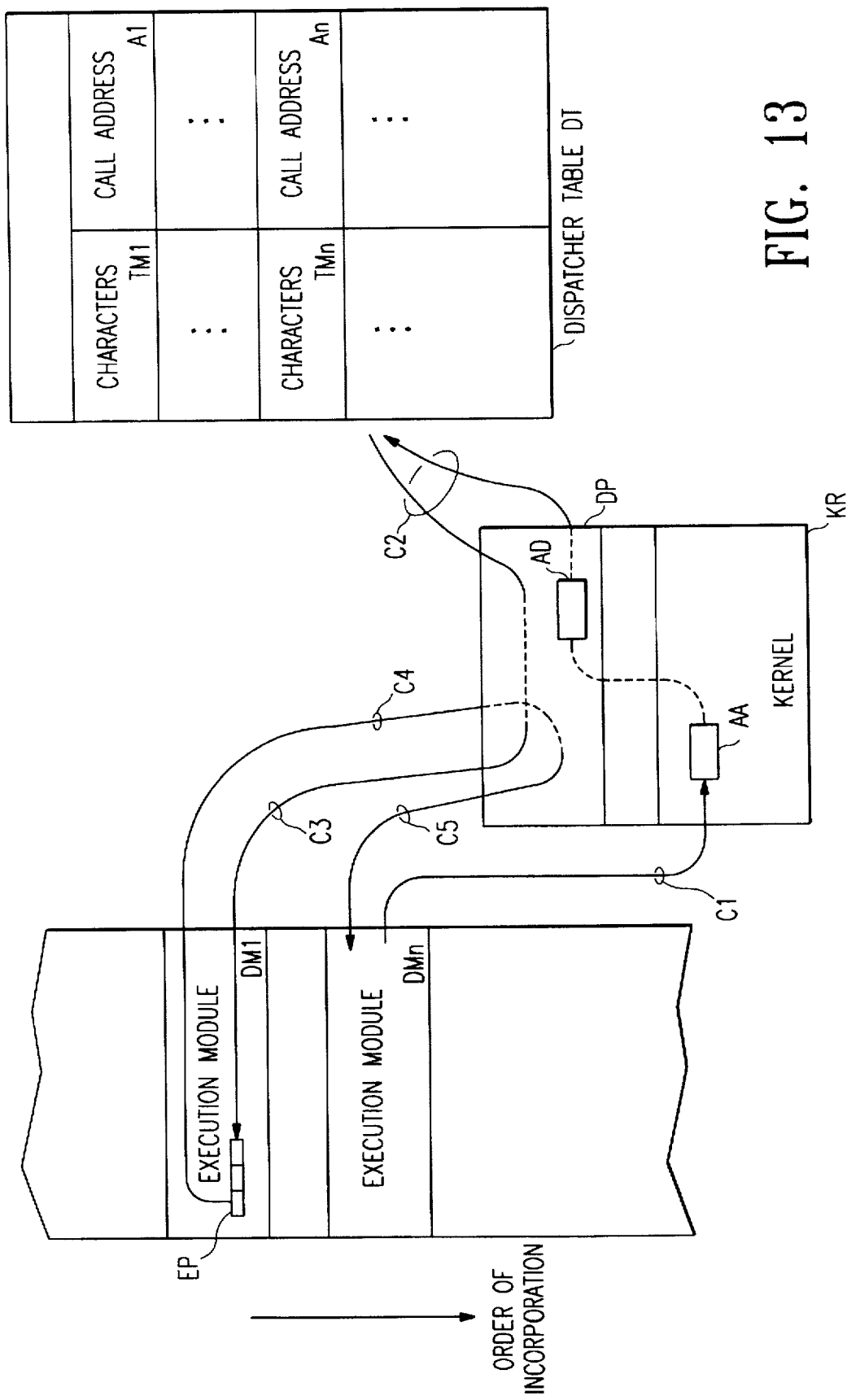
FIG. 13 is an illustration showing the method by which an execution module calls another execution module at the time of its registration.

After entry point EP is prepared, it is determined whether or not registration of an interrupt (step S240) should take place. If it should, the interrupt number to be registered is prepared (step S250). The number is prepared because where the execution module being incorporated uses an interrupt, the number of that interrupt must be registered in advance in interrupt controller emulator IRM, which is a module to emulate interrupts. After said processing, the call of the execution module that is the target of communication is requested from dispatcher DP via kernel KR (step S260, C1 in FIG. 13). When this happens, the execution module designates the called module by its name (characters) and delivers the prepared entry point EP for direct calling (the registered interrupt number, etc.) to dispatcher DP as parameters.

Figure 10:
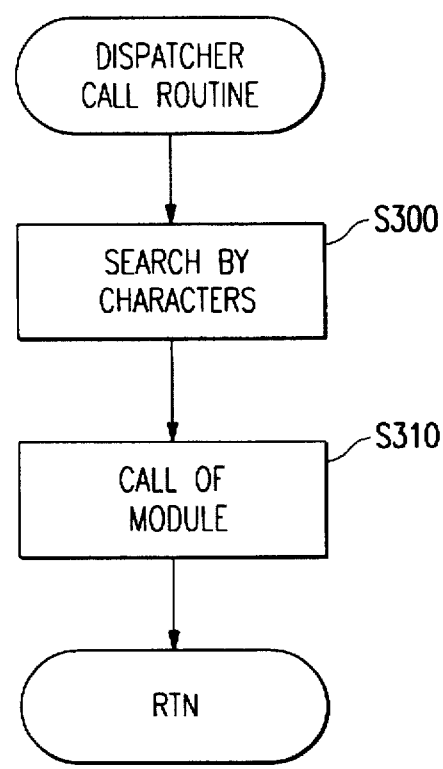
FIG. 10 is a flow chart showing the dispatcher call routine.

Dispatcher DP that receives the request executes the dispatcher call routine shown in FIG. 10. Since dispatcher DP has the name of the module to be called (characters), it searches dispatcher table DT using these characters (step S300, C2 in FIG. 13), obtains the call address and calls the module (step S310, C3 in FIG. 13). Dispatcher DP then delivers the parameters received from the calling module to the module called.

Figure 11:
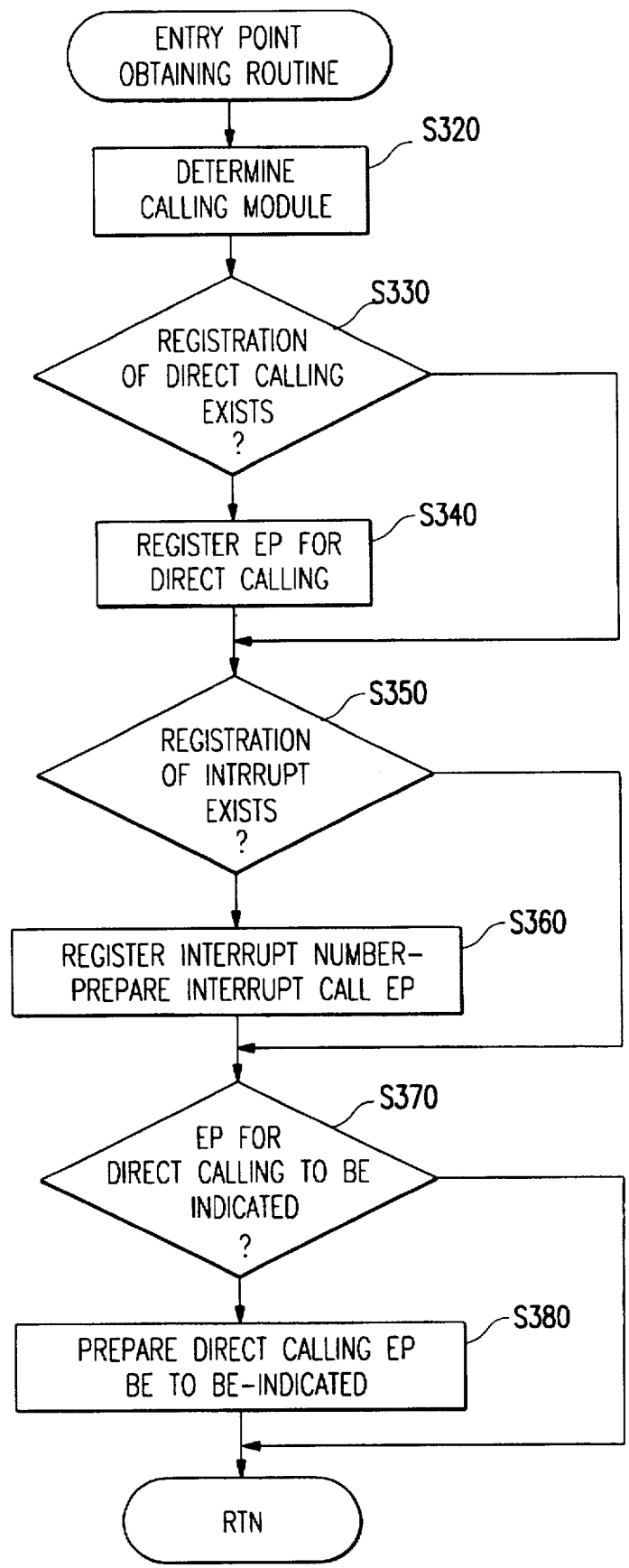
FIG. 11 is a flow chart showing the routine to obtain the entry point.
Figure 12:
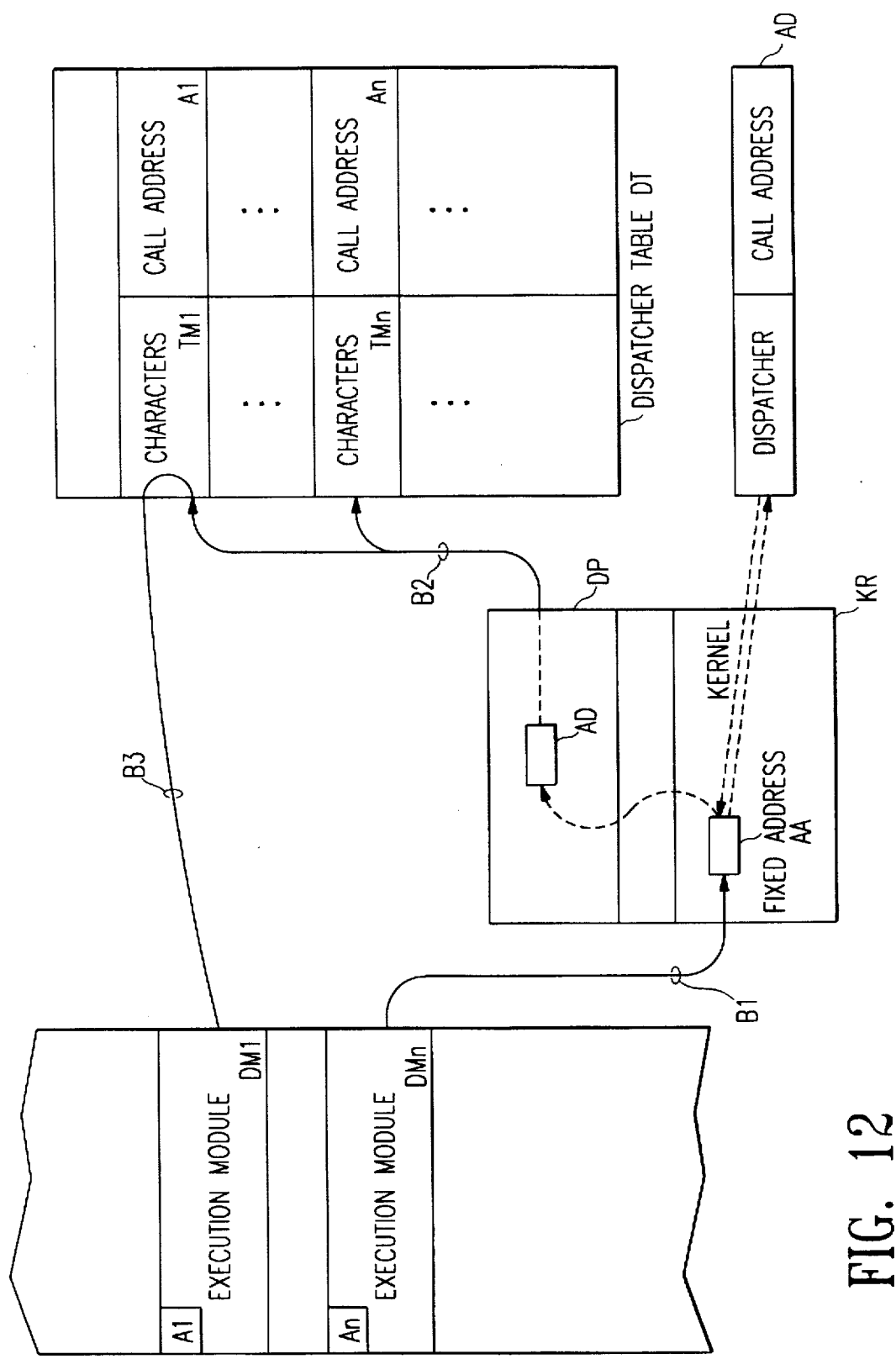
FIG. 12 is an illustration showing the method by which address registration takes place at the time of execution module incorporation.

The execution module which is to be the target of communication is called by dispatcher DP in the manner described above. That execution module then executes the routine to obtain entry points shown in FIG. 11. When this routine starts, the identity of the calling module is first determined (step S320). Where the calling execution module has entry point EP for direct calling as a parameter, this fact is determined (step S330), and entry point EP for direct calling is registered (step S340).

Where the module which executes the routine of FIG. 11 is interrupt controller emulator IRM, it is determined whether registration of an interrupt (step S350) should take place. If it should, the interrupt number received as part of the parameters is registered, and a routine to prepare entry point EP used for direct calling via interrupt is performed in order to indicate the entry point to an interrupting module (step S360). Since the module which registers interrupt numbers is limited to interrupt controller emulator IRM, if the routine of FIG. 11 is executed by other modules, the processes contained in steps S350 and S360 do not take place.

Subsequent to the routine to register interrupts, it is determined whether the calling module is a module which has entry point EP for direct calling in addition to entry point EP for interrupt calling (step S370). Where it is determined that it is necessary to give entry point EP for direct calling to the called module, entry point EP for direct calling to be given is prepared as a return value parameter (step S380).

After these processes, the routine comes to 'RTN', and thereby ends. Subsequently, control returns to the calling execution module (C5 in FIG. 13) via dispatcher DP (C4 in FIG. 13). When this happens, if there is a parameter that the called execution module prepared as a return value, this parameter is given to the calling execution module, which registers it as entry point EP.

Figure 14:
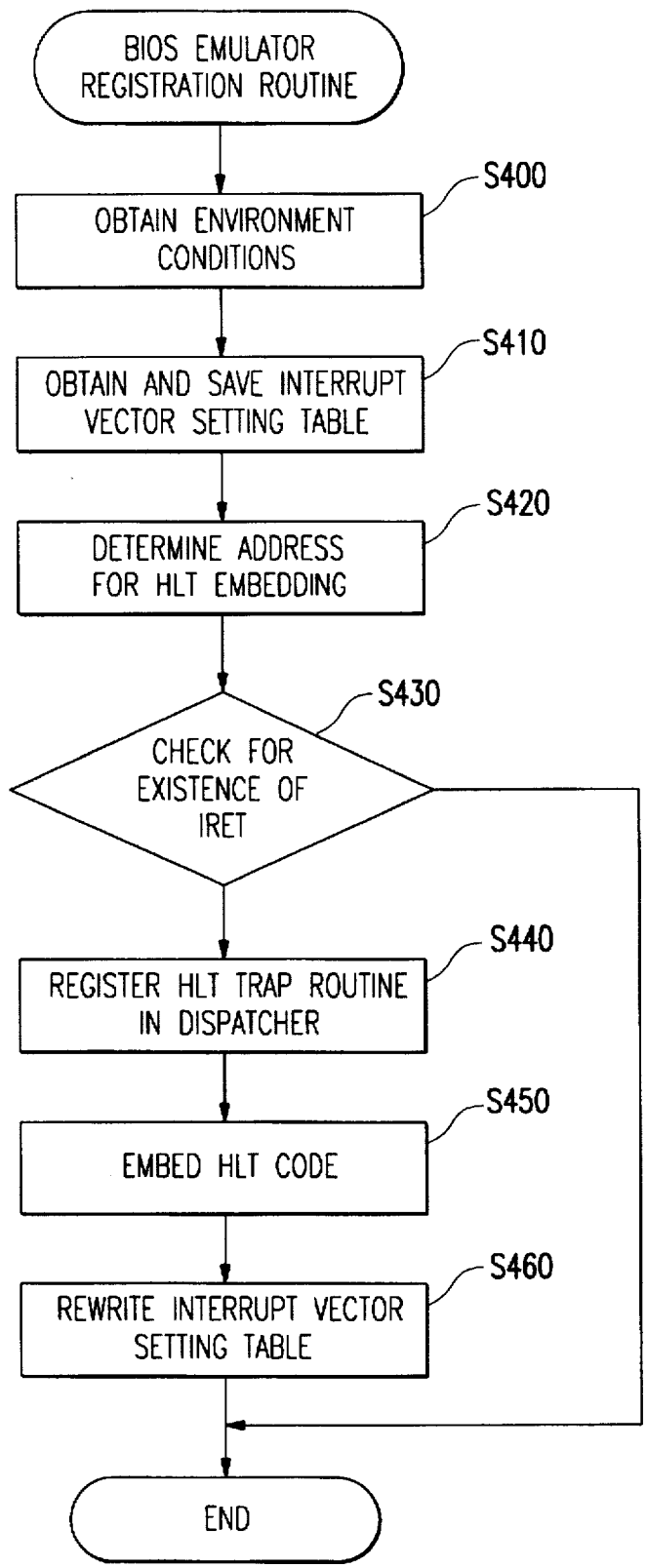
FIG. 14 is a flow chart showing the BIOS emulator registration routine.

The registration of a module for emulation of the BIOS will be explained below. FIG. 14 is a flow chart showing the routine to register a BIOS emulation function. Prior to the onset of this routine, the BIOS for a PC-9800 is allocated to the highest position of the memory area logically secured for the PC-9800. When the routine of FIG. 14 starts, environmental conditions such as the memory information and protected memory area information for the machine to be emulated are first obtained (step S400). This information is obtained via kernel KR because registration of memory emulator MEM, etc. occurs prior to the registration of this module.

The contents of BIOS interrupt vector setting table JT are then obtained and saved (step S410). The BIOS having a group of routines has its start addresses in jump table JT. Application program APP which is to call a certain BIOS routine either activates a software interrupt (INT xx) prescribed in advance or directly calls the BIOS. Where a software interrupt is activated, this jump table is referred to in an interrupt routine for said interrupt and the BIOS is called. The contents of jump table JT corresponding to the BIOS emulator module currently being established, i.e., the go-to address, are then obtained and saved in a prescribed area. This address is saved in advance because even where the request is made using the same software interrupt, the process to be executed varies depending on the value in the register, and when a routine described below in which BIOS emulation is not performed is requested, control may be transferred to the existing go-to address.

A process to determine the address for embedding the HLT instruction to stop the CPU (which is a privileged instruction) then takes place (step S420). The address for embedding the HLT instruction refers to a certain upper part of the emulated machine's memory area having approximately 11 continuous bytes. Such an area may be specified as a continuous area where the address data is 00H or FFh, because there is no program code having such continuous data. In addition, the area in which the HLT instruction will be placed is not determined in a fixed manner so as not to limit the number of modules performing BIOS emulation, as well as to avoid conflicts with the memory areas of other modules at the time of registration. The address for embedding the HLT instruction is automatically determined during the incorporation of the module. Hence, it is not necessary to secure the address in advance.

It is then checked whether or not an 'IRET' instruction exists in the original processing program of the BIOS being registered (step S430). This instruction is used to return to the program that called the BIOS routine when said routine is completed. Since it is possible that the loading of the BIOS program itself was not properly performed if this instruction is not found, the existence of said instruction is checked. Where an 'IRET' instruction is not found, an error message is output to the loader and the routine ends.

If an 'IRET' instruction exists, the HLT trap routine is registered in dispatcher DP (step S440). The registration in dispatcher DP takes place using eight characters, as explained above. After the registration in dispatcher DP, the HLT instruction is embedded in the address determined above (step S450). The HLT instruction, which comprises three bytes, is placed in the continuous 11 byte empty area searched for in step S420 starting from the top, and the name of the trap routine registered in dispatcher DP is written in the subsequent eight bytes.

Following the step described above, corresponding interrupt vector setting table JT is rewritten (step S460). Setting table JT is rewritten into a value that indicates the address into which the HLT instruction was embedded in step S450. After the above processes, this routine is ended.

Figure 15:
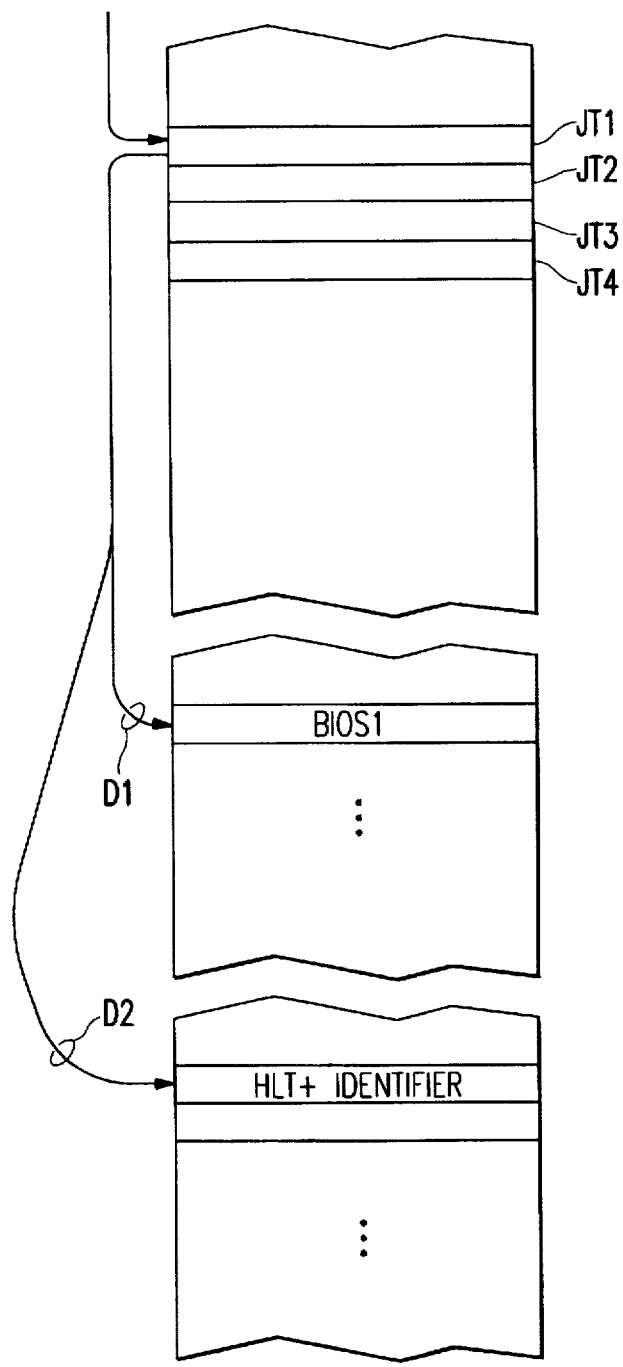
FIG. 15 is an illustration which conceptually shows one example of a BIOS call using jump table JT.

FIG. 15 demonstrates how this BIOS emulation takes place. While original BIOS1 is called by application program APP with reference to jump table JT1 (in BIOS emulation), this jump table JT1 is rewritten into a value that indicates the address into which the HLT instruction was embedded.

Initialization is completed by repeating the incorporation of execution modules and BIOS emulation modules explained above until the final module is incorporated. The execution mode then switches to virtual 86 mode and MS-DOS, which is the OS of the PC-9800, is booted in the machine now running as a PC-9800. More specifically, system files such as MSDOS.SYS and IO.SYS are read, COMMAND.COM is incorporated, and furthermore, the device driver registered in CONFIG.SYS is incorporated. These processes are the same as in the standard MS-DOS incorporation processes. Since the CPU has been switched to virtual 86 mode, they are no different from the processes by a PC-9800 to incorporate MS-DOS. Incidentally, when a DOS/V machine boots MS-DOS in its original state, files having identical names such as MSDOS.SYS are read, but these files have naturally different contents. Since these files are placed in the root directory in general, files having different contents cannot exist under the same name. Therefore, a dedicated application program is executed prior to the start of emulation and the file names for one of the machines, such as MSDOS.SYS, are changed.

With regard to various execution modules including BIOS emulation modules, module name (characters) TM and call address A at the minimum need to be registered in dispatcher table DT at the time of incorporation. However, in the case of an execution module which uses memory, required real memory is allocated in virtual memory for the PC-9800 (98 memory area), in addition to the above registration.

The processes described above create an environment for the emulation of the target machine (a PC-9800 in this embodiment) on the executing machine (a DOS/V unit in this embodiment). The method by which the emulation is performed will now be generally explained below with reference to FIG. 1, and the method by which the BIOS emulation modules perform processing will then be described in detail with an example.

After the completion of initialization, when various system files for the PC-9800 have been read and MS-DOS has been booted, a system prompt such as 'A:' is displayed on CRT 76. MS-DOS is operating in this state. When the operator attempts to start a certain application program and inputs its execution file name using keyboard 72, keyboard emulation takes place. In other words, 'programs on virtual PC' shown in FIG. 1 refer not only to application programs but also to all programs, including DOS. In the situation shown in the drawing, the DOS/V unit is operating in protected mode and the ring protect function in CPU 21 is at privilege level 3. The operation of the emulator will be explained with regard to a state in which application program APP has been loaded in the virtually prepared 98 memory area and the application program is being executed on the virtual PC in the above state.

Emulation processing is initiated in any of the following four situations:

(1) Page fault (access to an area to which memory is not allocated)

(2) General protection exception (execution of a privileged instruction, I/O read/write, execution of a write instruction to write-protected memory, access to address outside the set address range, etc.)

(3) Error (division by 0, etc.)

(4) Hardware interrupt

If any of these events occurs, kernel KR is activated. When this happens, kernel KR can investigate the cause of its activation since all values, etc. in registers are protected. KR then determines what address or I/O was accessed, or which function the hardware interrupt that occurred corresponds to, and calls dispatcher DP. Since the address used to call dispatcher DP was registered during initialization as shown in FIG. 12, kernel KR can call dispatcher DP via this call address AD. After control is transferred to kernel KR, the privilege level is set to 0.

Dispatcher DP specifies the execution module to call based on the information received from kernel KR and obtains its call address from dispatcher table DT. Dispatcher DP calls execution modules using this call address. While FIG. 1 shows the following execution modules described above, there are various other execution modules such as emulators that control the printer and serial communication via an RS-232C interface.

Memory emulator MEM
Mouse emulator MUM
Graphic emulator GEM
Text emulator TEM
Character font emulator CFM
Display emulator DEM
Timer emulator TIM
Keyboard emulator KEM
Interrupt controller emulator IRM Where a hardware interrupt occurs or application program APP executes a privileged instruction, control is transferred to kernel KR, whereupon kernel KR investigates the contents of the privileged instruction or the details of the hardware interrupt and calls dispatcher DP. Dispatcher DP receives the contents to emulate from kernel KR and calls the necessary execution module using a call address with reference to dispatcher table DT. The called execution module executes immediately if each process can be handled on its own. If processing by another execution module is needed, it directly calls such other execution module using entry point EP obtained in advance in the initialization stage. This is called module-to-module communication.

Figure 16:
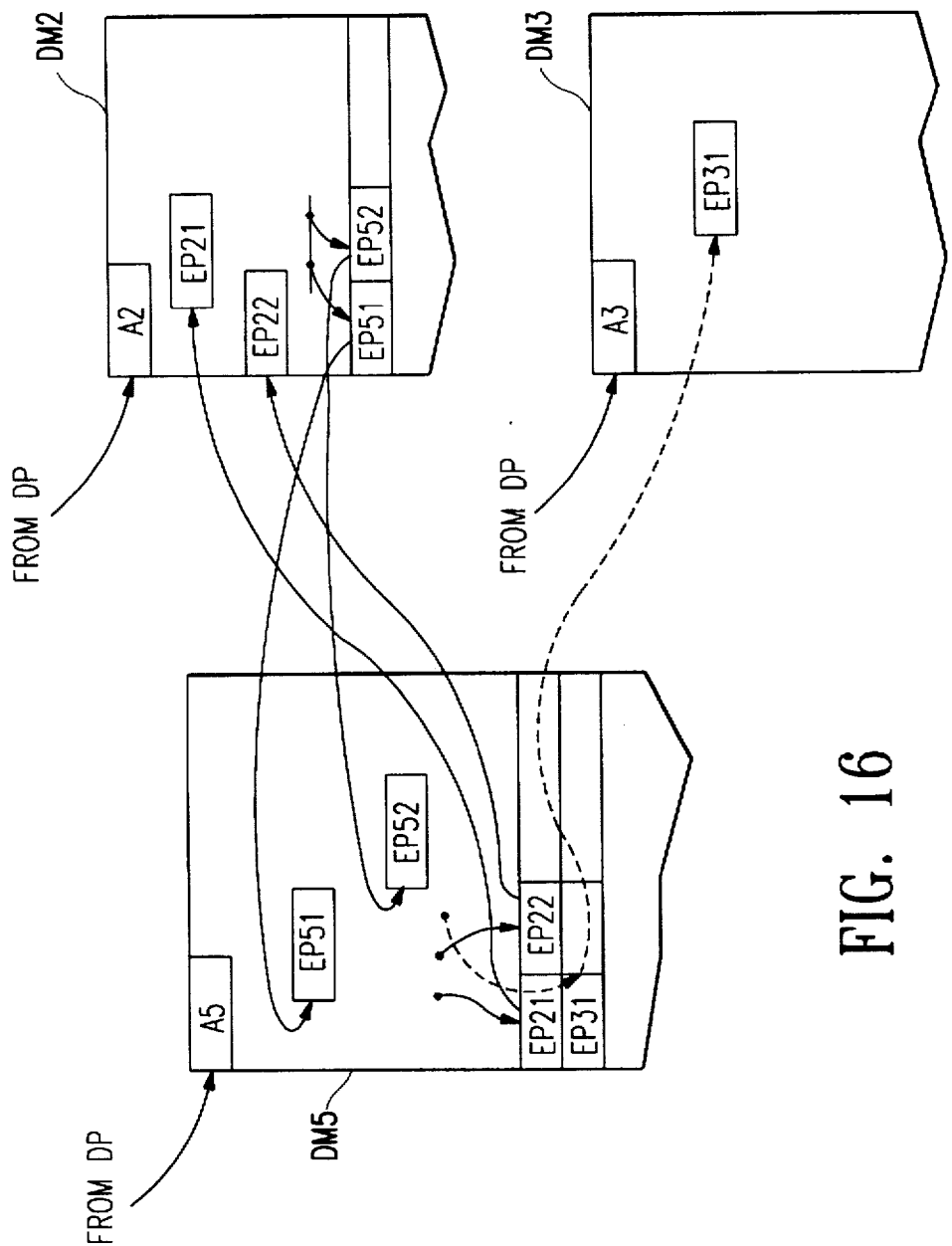
FIG. 16 is an illustration showing the method by which a direct call between execution modules (module-to-module communication) takes place.

FIG. 16 shows an example of a standard call of an execution module and module-to-module communication. In the example shown in FIG. 16, module-to-module communication takes place among execution modules DM2, DM3 and DM5. As shown in the drawing, when the execution modules are called by dispatcher DP, the start address for the entire module, such as A2, A3 and A5, is called. But in the case of module-to-module communication, one execution module routine directly calls an internal routine of another module when the need arises, using entry point EP obtained unilaterally or mutually during initialization. For example, where direct execution of an internal routine of execution module DM2 is necessary during an internal routine of execution module DM5, entry point EP21 is referred to and the internal routine of execution module DM2 is directly called and executed (C21). In the method to call another execution module via dispatcher DP, if the parameter that indicates the service needed by the calling module can be given, routines of other execution modules may be used on an individual basis. However, such procedures as requesting service from dispatcher DP, searching of dispatcher table DT by dispatcher DP, and calling using call address A must be followed. In comparison, in module-to-module communication, the needed routine is directly called, providing the advantage that needed processing may be executed very quickly.

After the emulation by execution modules DM of the processing that application program APP tried to execute, control is sequentially transferred to application program APP from kernel KR. Where interrupt controller emulator IRM is called due to a hardware interrupt or where interrupt controller emulator IRM is called by a routine of another execution module, interrupt controller emulator IRM generates a virtual interrupt to kernel KR in order to emulate the generation of an interrupt in a PC-9800. Kernel KR is called based on this virtual interrupt, and after making a determination with regard to this virtual interrupt, kernel KR re-calls a necessary execution module or returns control to application program APP if needed.

Figure 17:
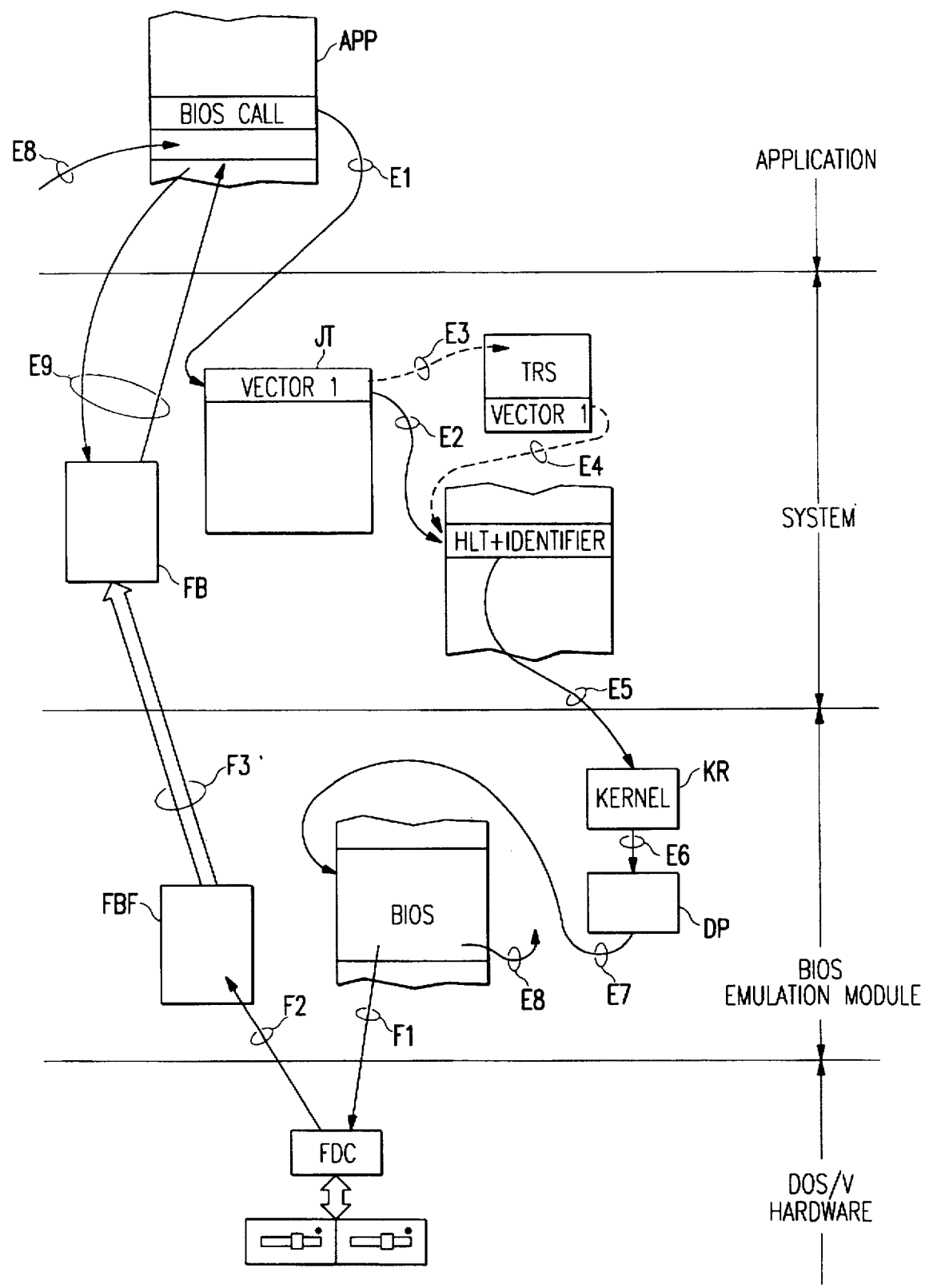
FIG. 17 is an illustration showing the manner in which the emulator of the embodiment emulates BIOS calls.

The operation in which application program APP tries to use a BIOS function of a PC-9800 will now be explained as an example of the emulation of functions of a PC-9800 performed on a DOS/V machine. FIG. 17 shows the process when application program APP calls the BIOS.

A case in which application program APP uses a BIOS routine prepared to read one sector of data from a floppy disk will be used as an example. When application program APP calls this BIOS routine in an attempt to use it, corresponding vector 1 of jump table JT is referred to in order to call the BIOS for a PC-9800 (E1 in FIG. 17). The call of the BIOS may be done using a software interrupt (INT xx) set in advance or through direct calling with reference to the jump table. Since vector 1 of jump table JT has been rewritten into an address in which a HLT instruction and an identifier are embedded in the initialization process when this BIOS emulation module was registered (see FIG. 14), in actuality, the HLT instruction, not the BIOS program, is executed (E2).

Here, if resident program TRS which is activated after taking over control from this BIOS is incorporated when MS-DOS is booted, because the incorporation of resident program TRS occurs after the incorporation of execution modules, vector 1 of jump table JT has been rewritten by resident program TRS. Therefore, resident program TRS is activated when jump table JT is referred to (E3 in FIG. 17). When rewriting vector 1 of jump table JT, resident program TRS saves the address written there, and after the completion of its processing, it tries to transfer control to the top of the BIOS program using original vector 1. In this case, therefore, the HLT instruction, which is the result of rewriting, is called (E4). In other words, resident program TRS properly operates regardless of the existence of BIOS emulation modules.

When the HLT instruction is executed, since this instruction is a privileged instruction, a trap occurs and control moves to kernel KR (E5). When a trap occurs, kernel KR analyzes its cause. If it recognizes that the cause of the trap is the execution of the HLT instruction, it reads the eight bytes following the HLT instruction, i.e., the identifier. After obtaining the identifier, kernel KR requests dispatcher DP to call the BIOS emulation module using said identifier (E6). Receiving this request, dispatcher DP refers to dispatcher table DT registered and calls the BIOS routine prepared as an emulation module (E7).

If the BIOS routine prepared as an emulation module is a routine to access the floppy disk device, for example, it controls compound I/O ports 54 and floppy disk device 82, which are used as DOS/V hardware. FIG. 17 shows an example in which data is read from floppy disk device 82. The BIOS emulation module reads 256 bytes of data from floppy disk device 82 and saves it in buffer area FBF (F1 and F2). The data read into buffer area FBF is transferred to disk buffer FB of the system by the BIOS emulation module.

After these sequences, processing by the BIOS emulation module is completed and control returns to the next instruction after the BIOS call of application program APP (E8). The return to application program APP may be made via dispatcher DP. Direct return is also possible by operating the stack for a subroutine call. Application program APP then completes the reading of data from floppy disk device 82 by reading the data transferred to the system's buffer FB (E9).

Using the emulator of the present invention explained above, when the BIOS is called, emulation is not commenced by trapping the call of the BIOS; instead, the procedure to call the BIOS via jump table JT is itself performed and a privileged instruction (a HLT instruction in the embodiment) is executed in the called routine, whereupon control is transferred to the BIOS emulation module. Therefore, the BIOS emulation module can be activated through reliable detection of the call not only where the BIOS is called via a software interrupt but also where it is directly called by obtaining its entry point through referring to the jump table. Moreover, both the resident program and the BIOS emulation module can be normally operated even where there is an incorporated resident program of the type that operates after taking over the call for the BIOS.

In addition, using the emulator of the present invention, the program that emulates the target machine on the executing machine is constructed in layers of kernel KR, dispatcher DP and execution modules, which offers a construction which is very easy to understand. Therefore, a large program to emulate a large number of functions may be efficiently developed. Moreover, since execution modules, including a BIOS emulation module, are modulized in a manner similar to the functioning of hardware, if application program APP is one that directly accesses the hardware, accurate emulation can take place.

If such a modular construction is used, ordinarily there would be a large number of modules and their management would be complex. However, in this embodiment, the execution module itself registers in dispatcher table DT its module name and call address at the time of incorporation, making the management, revision and renewal of many modules quite easy. Further, since the allocation of the dispatcher table is not fixed and registrations are made sequentially, no special processing need be performed when a new execution module is prepared or when the order of registration is changed.

Figure 18:
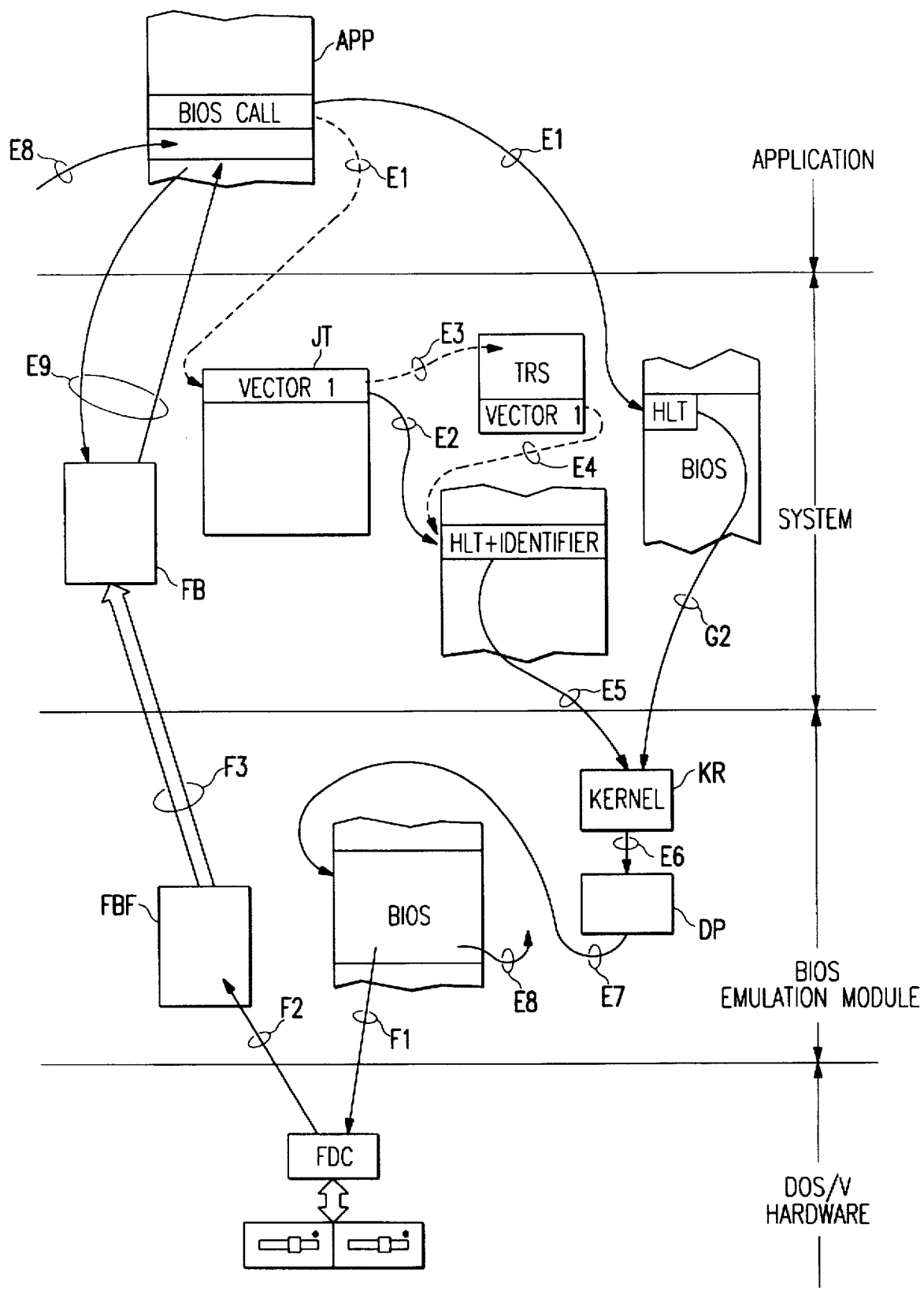
FIG. 18 is an illustration showing the method by which the emulator of a second embodiment of the present invention works.
Figure 19:
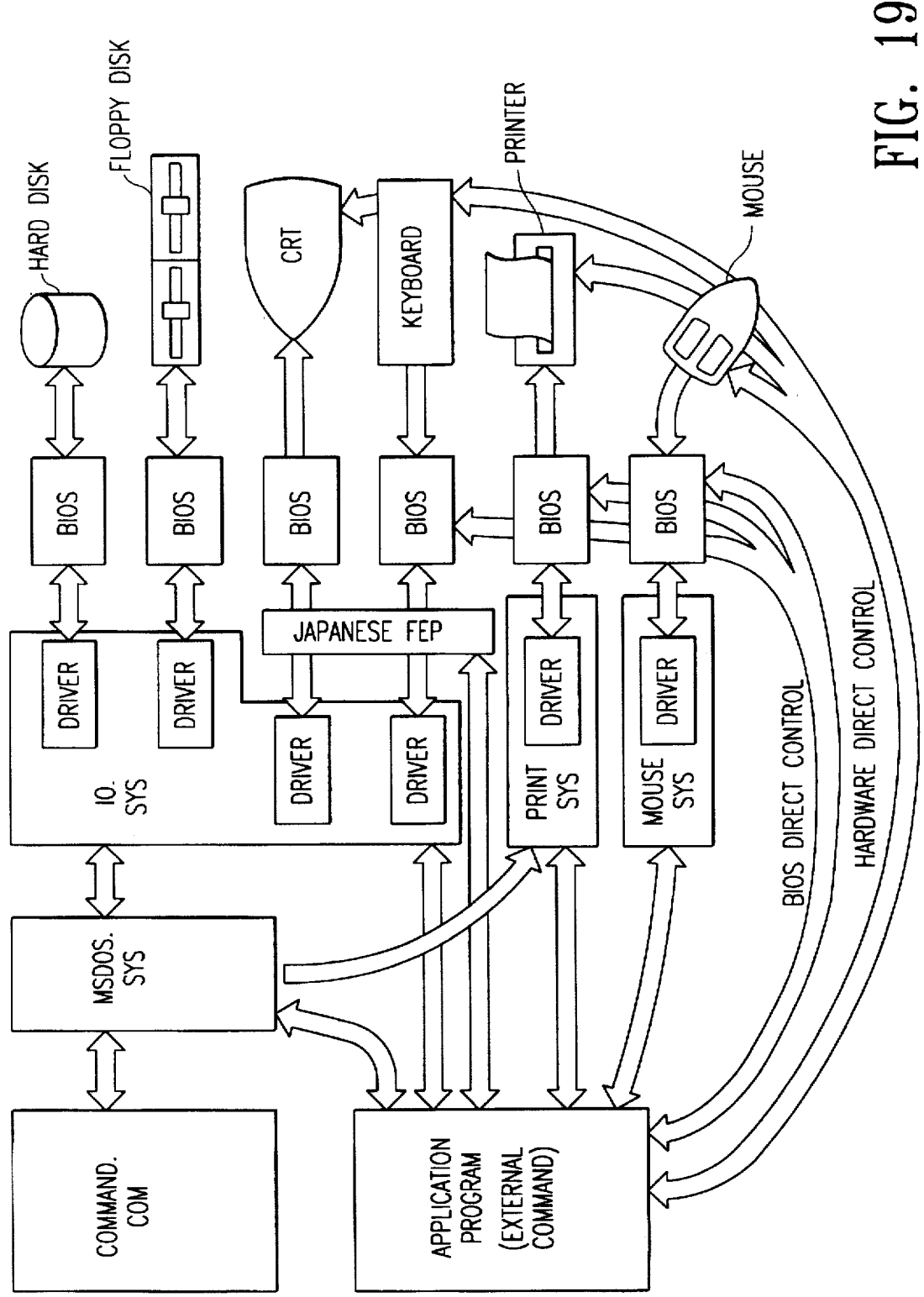
FIG. 19 is an illustration to explain the process by which application program APP calls the BIOS.

A second preferred embodiment is explained below. The emulator of the second embodiment has the identical hardware construction as the first embodiment. In this embodiment, as shown in FIG. 18, application program APP directly calls the entry point of the BIOS (G1). Among various types of BIOS, there are those whose specifications are published or which are standard device BIOS having a fixed entry point. Such BIOS may be directly called. In such a case, rewriting of the jump table cannot work. Therefore, in this embodiment, a HLT instruction is placed in this BIOS entry point itself.

Subsequently, when the BIOS is called by application program APP, kernel KR activates immediately and transfers control to the BIOS emulation module via dispatcher DP. Therefore, the BIOS call is reliably detected in the second embodiment as well as in the first embodiment and the emulation of the BIOS can take place.

In spite of the explanations above regarding embodiments of the present invention, the present invention is not limited to these embodiments only. It may naturally be implemented in various forms within a scope not deviating from the essence of the present invention. For example, it would be practical to have a construction in which the method of the first embodiment and the method of the second embodiment are both present within one emulator so that the most appropriate method is used based on the nature of the BIOS and how it is used. Needless to say, the present invention may be applied in the same fashion to a BIOS routine that accesses hard disk 84, or that accesses timer 68, or that controls the extended BIOS functions. In addition, it can also be applied to routines other than the BIOS, i.e., functions and procedures prepared as a library.

In the embodiments above, a construction in which a PC-9800 is realized on a DOS/V unit was used for the explanation. However, it is also easy to realize a DOS/V on a PC-9800. Further, the present invention may also be applied to other architectures.

As described above, with regard to a group of routines such as the BIOS, an emulator transfers control to a group of function modules that enable performance on the executing machine of routines equivalent to said routines after a routine is called and before the onset of actual processing. Control is not transferred to the substitute routine before the original routine is called. If there is another routine that starts processing by detecting the onset of the routine, emulation can be performed including the onset of the routine as well.

A detection section may detect the execution of a privileged instruction placed in the address through which one of the routines was called and transfer control to a corresponding one of the functional modules in accordance with the detection of the privileged instruction. Therefore, the calling of the routine may be reliably and easily detected.

The emulator may accurately emulate the BIOS routines by using the BIOS in the target machine. The emulator may eliminate unnecessary processing and efficiently move control to the emulation routines when privileged instructions stop the operation part of the executing machine.

A privileged instruction may be allocated to a prescribed memory area and the contents of the jump table may be converted into an address to which the privileged instruction is allocated prior to the onset of emulation. The execution of the privileged instruction placed in the address through which one of the routines was called is detected. Control is then transferred to a corresponding one of the function modules based on this detection of a privileged instruction. Therefore, operation of the transfer controller may be automatically obtained.

An area to which a privileged instruction may be allocated is sought in a prescribed memory region. An identifier that indicates a corresponding routine is allocated to a found area together with the privileged instruction. Thus, it can allocate the privileged instruction to an area which it finds on its own. If there is more than one corresponding routine when the privileged instruction is executed, the identification of its cause is made easy through the allocation of identifiers for said corresponding routines. This makes the performance of necessary emulation easy.

What is claimed is:

1. An emulator for executing on an executing machine, the executing machine being a computer having an architecture equipped with at least a processing unit, memory and input/output unit, and programs designed for a target machine, the target machine being a computer equipped with an architecture different from the architecture of said executing machine, the emulator comprising:

a plurality of function modules that allow the executing machine to execute processes equivalent to processes that can be called via a jump table in the target machine; and a transfer section for transferring one of said processes to a corresponding one of said function modules in said executing machine prior to the actual onset of processing when the one of said processes in the target machine is called via said jump table, wherein said transfer section comprises:

a privileged instruction allocator for allocating the privileged instruction to a memory area prior to the onset of emulation;

a section for replacing the contents of said jump table with an address to which said privileged instruction was allocated prior to the onset of emulation; and a detector for detecting the execution of said privileged instruction placed in the address through which one of said processes was called, wherein processing is transferred to a corresponding one of said group of function modules according to the detection of said privileged instruction.

2. The emulator of claim 1, wherein said privileged instruction allocator comprises:

a searching section for seeking an area in a memory region to which said privileged instruction may be allocated, and an identifier allocator for allocating an identifier that indicates the corresponding one of said processes in said area together with said privileged instruction.

* * * * *